UNITED STATES PATENT OFFICE.

ARMIN EROSA AND ADRIANO EROSA, OF MERIDA, MEXICO.

PROCESS OF MAKING FLOUR OF MAIZE.

987,560.　　　　Specification of Letters Patent.　　Patented Mar. 21, 1911.

No Drawing.　　Application filed October 29, 1909. Serial No. 525,364.

*To all whom it may concern:*

Be it known that we, ARMIN EROSA and ADRIANO EROSA, citizens of the United Mexican States, residing at Merida, in the State of Yucatan, Mexico, have invented certain new and useful Improvements in Processes of Making Flour of Maize, of which the following is a specification.

Our invention relates to a process under which flour is produced from fecula of maize, which has previously been subjected to the well known partial cooking with a solution of calcium hydroxid which converts the cereal or grains into the so-called "nixtamal". Nixtamal is an Indian term adopted in the Spanish language of most Latin American republics, and known by everybody in these countries as the maize grains, when they have been cooked in a solution of calcium hydroxid raised to a temperature of some 60 centigrades. Nixtamal is mentioned in the *Gran Diccionairo Clasico de la Lengua Espanola* by Ramon Joaquin Dominguez, 17th edition, in which on page 234 it reads: Nixtamal:—maize half boiled in water and a thin solution of lime, which is used for making tortillas (pan cakes).

In carrying out the process the cereals are ground added with potable water for facilitating the grinding, and the mass which is thus formed in the mill is then compressed and converted into more or less dry blocks, which are completely dried in heating chambers, and from where the dried substance is passed through the mill, that will deliver it either as a finer or coarser flour according to the purpose.

The object of our invention is to provide a flour, that will conserve its qualities for several months without decomposing, and especially to produce a flour of "nixtamal", the definition of which we have already given, possessing such quality as above stated.

Different processes have been known for making flour of "nixtamal", but none of the products thereof have so far proved to unite the required conditions, both for not having the natural taste and flavor of the maize-cake (tortilla), made of fresh paste as it proceeds from the mill, as also because the cakes made of such flour have been similar in taste to "nixtamal" again moistened and subjected to new cooking, and the cakes made of such flour have lacked of the tendency to duly inflate under the baking, and finally the greatest deficiency has been, that such flour could not be conserved without putrefying in relatively short time.

Our process consists in exposing the cereals of maize to the act of boiling with calcium hydroxid or calcium hydrate at the usual heat, which grade of temperature has been approved as adequate at about 60 centigrades, thereafter thoroughly washing the grains, which are thus transformed into what is called "nixtamal", then pouring these grains together with potable water in the proportion of 2 parts to 1 into a common mill adapted for the purpose of grinding maize, so as to insure a more efficient grinding on account of the plastic consistence, thereupon under pressure forming the paste or mass into blocks for preliminary drying and avoiding the more advanced boiling of the material, which would otherwise result due to its containing liquid, when subjected to a temperature of 90-95 degrees centigrade, which we utilize for effecting the complete drying of the material. The hull of the maize is loosened by the boiling and does not enter the mill with the fecula.

As stated, after having expressed the liquid from the paste or mass in its condition as it proceeds from the mill, and having been formed into blocks, these are inserted in a heating chamber or stove conserving a temperature of about 90-95 degrees centigrade, wherein the drying process of the material is completed, and from which it comes out as a thoroughly dried substance in fragments, and now having the quality desired, namely that of conserving its taste and flavor for several months. After drying the material is finally passed through a mill that will deliver it either as a fine or coarser flour as desired.

As an example of carrying out the partial cooking 43 kilos of maize is partly cooked in a solution of 18 gallons of water with 600 grams of the hydrate.

It is impossible to give any exact proportion as it depends upon the quality of the maize, whether it be new or old grain and of course also upon the strength of the hydrate.

We claim:

1. The process of making flour of maize, consisting in subjecting the maize to a partial boiling in calcium hydrate at about 60 degrees centigrade, removing the hull, then grinding the fecula with potable water, expressing the liquid of the paste, which results, and completing the drying under the temperature of about 90-95 degrees centigrade, and again grinding the material.

2. The process of making flour of maize, consisting in partially boiling the maize in calcium hydrate, heated to about 60 degrees centigrade, removing the hull, thereafter grinding two parts of said fecula with one part of potable water to a paste, expressing the liquid by pressure from said paste, and introducing said paste preliminarily dried into a heating chamber in which is maintained a temperature of 90-95 degrees centigrade, and finally grinding the completely dried product to a flour.

In testimony whereof we have affixed our signatures in presence of two witnesses.

ARMIN EROSA.
ADRIANO EROSA.

Witnesses:
PEDRO PENICHE LÓPEZ,
TOMÁS PENICHE LÓPEZ.